United States Patent Office 3,391,167
Patented July 2, 1968

3,391,167
3α,17α-DIACYLOXY-4α,8,14-TRIMETHYL-18-NOR-
5α,8α,14β-ANDROST-9(11)-ENE
Gerald W. Krakower, Elizabeth, N.J., assignor, by mesne assignments, to E. R. Squibb & Sons, Inc., New York, N.Y., a corporation of Delaware
No Drawing. Filed June 28, 1965, Ser. No. 467,709
2 Claims. (Cl. 260—397.5)

ABSTRACT OF THE DISCLOSURE

This disclosure teaches the art new steroidal compounds having the formula

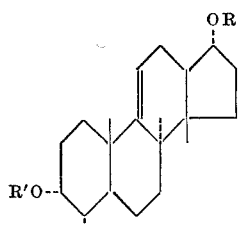

wherein R and R' are acyl, and the process for making them. These compounds are useful as anti-androgens.

---

This invention relates to and has as its object the provision of new physiologically active steroids, novel methods for their production and new intermediates useful in said preparation. More particularly, this invention relates to the preparation of compounds of the formula

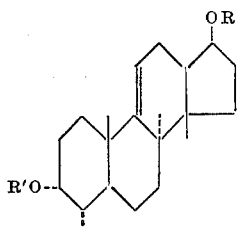

wherein R and R' are acyl.

The novel compounds of this invention are pharmacologically active substances that possess anti-androgenic activity (i.e., they can be utilized in the treatment of such conditions as hyperandrogenic acne). They are also useful as anti-estrogenic agents. The compounds may be formulated for such administration, the concentration and/or dosage being based on the activity of the particular compound and the requirements of the patient.

Acyl represents the acyl moiety of an acid group consisting of a lower alkanoic acid of less than twelve carbons and may be the same or different, e.g., acetic, propionic, butyric and tert-pentanoic acid; monocyclic hydrocarbon monocarboxylic acids of from six to twelve carbons, e.g., benzoic and toluic acid; and mononuclear aromatic hydrocarbon aralkanoic acids, e.g., phenacetic and β-phenylpropionic acid; the lower alkenoic acids; the cycloalkane-carboxylic acids and the cycloalkenecarboxylic acids.

The final compounds of this invention may be prepared according to the processes of this invention beginning with a 3α-acyloxy-4α,8,14-trimethyl-18-nor-5α,8α,9β,14β-androstane-11,17-dione (or any other 3-acyloxy derivative thereof) as a starting material. The starting material is first reduced as by reacting it with lithium tri-tert-butoxyaluminum hydride in a suitable solvent, e.g., tetrahydrofuran under reflux conditions to yield a new intermediate 3α - acyloxy - 17α - hydroxy - 4α,8,14 - trimethyl - 18 - nor-5α,8α,9β,14β-androstane-11-one. This new intermediate is then acylated as by treatment with an acid anhydride, for example, acetic anhydride to yield the 3α,17α-diacyloxy derivatives of the invention.

This new diacylated intermediate is then reduced by reacting it with a metal hydride, preferably sodium borohydride at ambient temperatures (e.g., between 22 to 24° C.) to form the 3α,17α-diacyloxy-11α-hydroxy intermediate of the invention. This intermediate can then be dehydrated in the presence of an aromatic base and an inorganic acid halide, such as pyridine and thionyl chloride at a temperature from —20 to 0° C. to form the $\Delta^{9(11)}$ compounds of the invention.

The process of this invention may best be illustrated by the following equations:

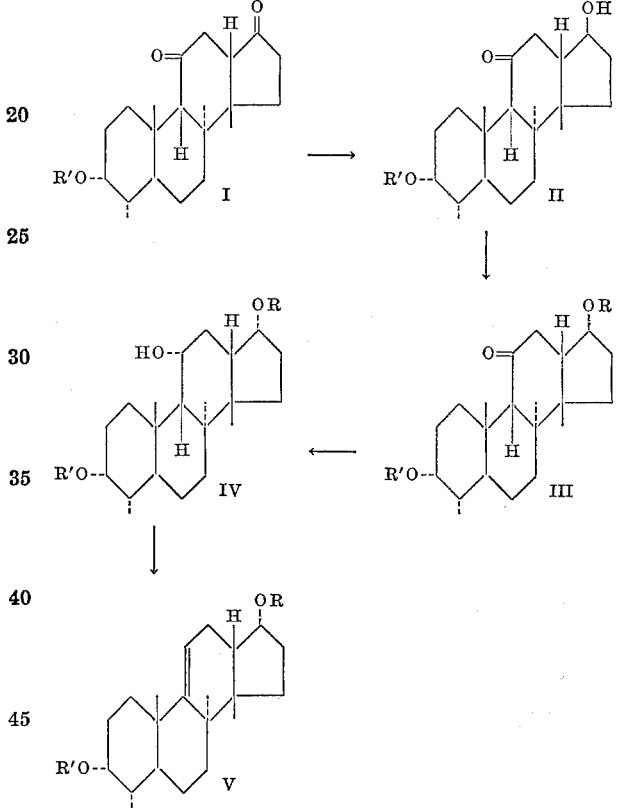

wherein R and R' are acyl.

The invention may be illustrated by the following examples. All temperatures are in degrees centigrade unless otherwise stated:

Example 1.—3α-acetoxy-17α-hydroxy-4α,8,14-trimethyl-
18-nor-5α,8α,9β,14β-androstane-11-one (II)

A solution of 100 mg. of 3α-acetoxy-4α,8,14-trimethyl-18-nor-5α,8α,9β,14β-androstane-11,17-dione (I) and 275 mg. of lithium tri-tert-butoxyaluminum hydride in 10 ml. of tetrahydrofuran (freshly distilled from lithium aluminum hydride) is heated at reflux for ninety minutes. The mixture is cooled, acidified with glacial acetic acid and the solvent evaporated. The residue is extracted with methyl isobutyl ketone and washed with 5% sodium bicarbonate and saturated sodium chloride solution, dried and evaporated. The crude product is recrystallized from ether-hexane to give 21 mg. of 3α-acetoxy-17α-hydroxy-4α,8,14 - trimethyl-18-nor-5α,8α,9β,14β-androstane-11-one (II), M.P. 165–169° C. The analytical sample has M.P. 167–169° C. $[\alpha]_D$ —17.2°.

Analysis.—Calc'd for $C_{23}H_{36}O_4$: C, 73.36; H, 9.64. Found: C, 73.48; H, 9.66.

Example 2.—3α,17α-diacetoxy-4α,8,14-trimethyl-18-nor-5α,8α,9β,14β-androstane-11-one (III)

A solution of 170 mg. of 3α-acetoxy-17α-hydroxy-4α,8,14 - trimethyl - 18-nor-5α,8α,9β,14β-androstane-11-one (II), in 2 ml. of pyridine and 7 ml. of acetic anhydride is kept overnight at room temperature (about 23° C.). The reaction mixture is diluted with water and evaporated to dryness. The resulting oil, 3α,17α-diacetoxy-4α,8,14-trimethyl - 18 - nor - 5α,8α,9β,14β-androstane-11-one (III), shows as a single spot when analyzed by thin layer chromatography on Activity V—alumina.

Example 3.—3α,17α-diacetoxy-11α-hydroxy-4α,8,14-trimethyl-18-nor-5α,8α,9β,14β-androstane (IV)

A solution of 116 mg. of non-crystalline 3α,17α-diacetoxy - 4α,8,14 - trimethyl-18-nor-5α,8α,9β,14β-androstane-11-one (III) and 90 mg. of sodium borohydride in 10 ml. of absolute ethanol is stirred at room temperature for one hour. The reaction mixture is acidified with glacial acetic acid and the solvent evaporated. The residue is extracted with ethyl acetate, washed with saturated sodium chloride solution, dried and evaporated to give 119 mg. of crude product. Two recrystallizations from methanol gives 42 mg. of 3α,17α-diacetoxy-11α-hydroxy-4α,8,14-trimethyl-18-nor-5α,8α,9β,14β-androstane (IV) M.P. 177–179° C., the analytical sample has M.P. 178–180°, $[\alpha]_D$ —101.5°.

*Analysis.*—Calc'd for $C_{25}H_{40}O_5$: C, 71.39; H, 9.59. Found: C, 71.30; H, 9.58.

Example 4.—3α,17α-diacetoxy-4α,8,14-trimethyl-18-nor-5α,8α,14β-androst-9(11)-ene (V)

A solution of 100 mg. of thionyl chloride in 1 ml. of pyridine is added over a period of one minute to a solution of 100 mg. of 3α,17α-diacetoxy-11α-hydroxy-4α,8,14-trimethyl-18-nor-5α,8α,9β,14β-androstane (IV) in 3.0 ml. of pyridine at —20° C. The mixture is then kept at 0° C. for twenty minutes and diluted with water. Extraction with ethyl acetate is followed by washing the organic phase with 5% hydrochloric acid saturated salt solution, and evaporation of the ethyl acetate. The resulting viscous oil cannot be crystallized. Distillation at 180° C. and 0.001 mm. pressure gives a clear, colorless, gum $[\alpha]_D$ —83°.

*Analysis.*—Calc'd for $C_{25}H_{38}O_4$: C, 74.59; H, 9.52. Found: C, 74.38; H, 9.19.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:
1. A compound having the formula

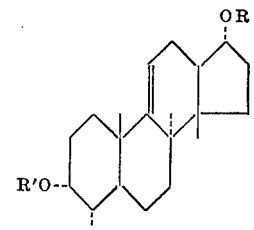

wherein R and R' are acyl where the acyl is a hydrocarbon carboxylic acid of less than twelve carbons.

2. 3α,17α - diacetoxy - 4α,8,14-trimethyl-18-nor-5α,8α,14β-androst-9(11)-ene.

References Cited

Bucourt, R., and Legrand, M.: "Comptes Rendus Hebdomadaires des Seances de L'Academie des Sciences," 258, April 1964, pp. 3491–3494.

"Steroid Reactions" by Djerassi (1963), published by Holden-Day, Inc., San Francisco, page 146 and page 238.

Godtfredsen et al.: "Tetrahedron" (1962), vol. 18, pp. 1029–1048.

Arigoni et al.: "Experientia" (1963), XIX, pp. 521–522.

LEWIS GOTTS, *Primary Examiner.*

E. G. LOVE, *Assistant Examiner.*